(12) United States Patent
Jarmoszuk et al.

(10) Patent No.: US 7,877,929 B2
(45) Date of Patent: Feb. 1, 2011

(54) METHOD AND APPARATUS FOR REDUCING FERTILIZER USE IN AGRICULTURAL OPERATIONS

(75) Inventors: Nicholas Jarmoszuk, Rocky River, OH (US); Paul Sakiewicz, Englewood, CO (US)

(73) Assignee: Rezzorb, LLC, North Captiva, FL (US)

( * ) Notice: Subject to any disclaimer, the term of this patent is extended or adjusted under 35 U.S.C. 154(b) by 0 days.

(21) Appl. No.: 12/184,947

(22) Filed: Aug. 1, 2008

(65) Prior Publication Data

US 2009/0031627 A1 Feb. 5, 2009

Related U.S. Application Data

(60) Provisional application No. 60/954,005, filed on Aug. 4, 2007.

(51) Int. Cl.
  *A01G 9/02* (2006.01)
(52) U.S. Cl. .......................... 47/65.7; 47/48.5
(58) Field of Classification Search ............... 47/65.7, 47/65.8, 80, 48.5, 73, 74, 76, 77, 78, 65.5, 47/66.6
  See application file for complete search history.

(56) References Cited

U.S. PATENT DOCUMENTS

| | | | |
|---|---|---|---|
| 2,043,009 A | 6/1936 | Reich | |
| 2,684,295 A | 5/1951 | Eyster et al. | |
| 3,147,569 A | * 9/1964 | Murguia | ............ 47/73 |
| 3,960,763 A | 6/1976 | Lambou et al. | |
| 3,964,887 A | 6/1976 | Hickey et al. | |
| 4,011,325 A | 3/1977 | Kay | |
| 4,019,279 A | 4/1977 | Moorman et al. | |
| 4,030,639 A | 6/1977 | Parish et al. | |
| 4,056,897 A | 11/1977 | Pearce et al. | |
| 4,137,332 A | 1/1979 | Brown et al. | |
| 4,184,412 A | 1/1980 | Hall | |
| 4,242,502 A | 12/1980 | Malinow et al. | |
| 4,244,710 A | 1/1981 | Burger | |
| 4,299,613 A | 11/1981 | Cardarelli | |
| 4,326,594 A | 4/1982 | Oka et al. | |
| 4,383,391 A | 5/1983 | Thomas et al. | |
| 4,461,270 A | 7/1984 | Sutter | |

(Continued)

FOREIGN PATENT DOCUMENTS

BG    99633    3/1997

(Continued)

OTHER PUBLICATIONS

International Search Report for International (PCT) Patent Application No. PCT/US08/071966, mailed Aug. 1, 2008.

(Continued)

*Primary Examiner*—T. Nguyen
(74) *Attorney, Agent, or Firm*—Sheridan Ross P.C.

(57) ABSTRACT

An agricultural method is provided for reducing the amount of fertilizer needed to effectively grow various plants as well as reducing fertilizer run-off, therefore minimizing fertilizer contamination of groundwater. A composition and/or material are also provided to facilitate the agricultural method. The material may include a semi-permeable or selectively permeable membrane made out of, for example, activated charcoal. An apparatus is also provided that incorporates the composition and/or material.

2 Claims, 6 Drawing Sheets

U.S. PATENT DOCUMENTS

| | | |
|---|---|---|
| D278,553 S | 4/1985 | Cherry |
| 4,539,461 A | 9/1985 | Benedict et al. |
| 4,579,363 A | 4/1986 | Allen et al. |
| 4,613,377 A | 9/1986 | Yamazaki et al. |
| 4,623,449 A | 11/1986 | Böhnensieker |
| 4,649,035 A | 3/1987 | Barber |
| H255 H | 4/1987 | Genovese et al. |
| 4,732,591 A | 3/1988 | Tujisawa et al. |
| 4,768,423 A | 9/1988 | Boeger |
| 4,798,723 A | 1/1989 | Dart et al. |
| 4,808,722 A | 2/1989 | Henire, II |
| 4,875,921 A | 10/1989 | Paau |
| 4,920,105 A | 4/1990 | Zelman |
| 4,989,506 A | 2/1991 | McCormick |
| 4,992,084 A | 2/1991 | Von Blücher et al. |
| 5,008,200 A | 4/1991 | Ranch et al. |
| 5,127,187 A | 7/1992 | Hattori et al. |
| 5,135,659 A | 8/1992 | Wartanessian |
| 5,145,954 A | 9/1992 | Anthony |
| 5,177,008 A | 1/1993 | Kampen |
| 5,177,009 A | 1/1993 | Kampen |
| 5,181,951 A * | 1/1993 | Cosse, Jr. .................. 71/64.11 |
| 5,196,042 A | 3/1993 | Iijima |
| 5,200,082 A | 4/1993 | Olsen et al. |
| 5,201,860 A | 4/1993 | Richardson |
| 5,212,904 A | 5/1993 | Green et al. |
| 5,213,857 A | 5/1993 | Erkkilä |
| 5,222,326 A | 6/1993 | Higgins |
| 5,224,598 A | 7/1993 | Angeles et al. |
| 5,275,154 A | 1/1994 | Von Blücher et al. |
| 5,302,287 A | 4/1994 | Losack |
| 5,305,549 A | 4/1994 | Albrecht |
| 5,310,568 A | 5/1994 | Lini |
| 5,311,700 A | 5/1994 | Thomas |
| 5,312,474 A | 5/1994 | Iijima |
| 5,312,801 A | 5/1994 | Sondahl et al. |
| 5,331,908 A | 7/1994 | Loeb |
| 5,337,516 A | 8/1994 | Hondulas |
| 5,383,302 A | 1/1995 | Hill |
| 5,413,618 A | 5/1995 | Penningsfeld et al. |
| 5,442,891 A | 8/1995 | Albrecht |
| 5,528,857 A | 6/1996 | Ashleigh et al. |
| 5,529,597 A | 6/1996 | Iijima |
| 5,575,112 A | 11/1996 | Scheubel |
| 5,575,928 A | 11/1996 | Peltier, Jr. et al. |
| 5,583,633 A | 12/1996 | Matsumura et al. |
| 5,599,461 A | 2/1997 | Peltier, Jr. et al. |
| 5,613,605 A | 3/1997 | Angeles et al. |
| 5,618,428 A | 4/1997 | Oslund |
| 5,646,157 A | 7/1997 | Hohl |
| 5,647,169 A | 7/1997 | Bui |
| 5,676,727 A | 10/1997 | Radlein et al. |
| 5,676,836 A | 10/1997 | Yamasaki et al. |
| 5,690,178 A | 11/1997 | Zehrung, Jr. et al. |
| 5,695,541 A | 12/1997 | Kosanke et al. |
| 5,714,157 A | 2/1998 | Sandell et al. |
| 5,730,918 A | 3/1998 | Nikolskaja et al. |
| 5,744,161 A | 4/1998 | Majeed et al. |
| 5,768,866 A | 6/1998 | Minnich |
| 5,799,440 A | 9/1998 | Ishikawa et al. |
| 5,821,126 A | 10/1998 | Durzan et al. |
| 5,829,193 A * | 11/1998 | Otake et al. .................. 47/65.8 |
| 5,876,484 A | 3/1999 | Raskin et al. |
| 5,884,570 A | 3/1999 | Lincoln |
| 5,921,024 A | 7/1999 | Minoji |
| 5,953,858 A | 9/1999 | Loosen |
| 6,142,703 A | 11/2000 | Wilmot et al. |
| 6,178,691 B1 | 1/2001 | Caron et al. |
| 6,243,984 B1 | 6/2001 | Wright |
| 6,247,267 B1 | 6/2001 | Motz et al. |
| 6,273,927 B1 | 8/2001 | Yang |
| 6,299,774 B1 | 10/2001 | Ainsworth et al. |
| 6,302,936 B1 | 10/2001 | Adam |
| 6,326,202 B1 | 12/2001 | Mathur et al. |
| 6,409,789 B1 | 6/2002 | Gilbert |
| 6,419,722 B1 | 7/2002 | Adam |
| 6,420,624 B1 | 7/2002 | Kawase |
| 6,460,624 B1 | 10/2002 | Dufty |
| 6,505,687 B1 | 1/2003 | Wichmann |
| 6,517,599 B2 | 2/2003 | Gilbert |
| 6,521,452 B1 | 2/2003 | Abdelrahman |
| 6,537,947 B1 | 3/2003 | Johns et al. |
| 6,569,332 B2 | 5/2003 | Ainsworth et al. |
| 6,571,544 B1 | 6/2003 | Buss et al. |
| 6,602,991 B1 | 8/2003 | Storpirtis et al. |
| 6,615,537 B2 | 9/2003 | Tonkin et al. |
| 6,643,978 B2 | 11/2003 | Price |
| 6,645,267 B1 | 11/2003 | Dinel |
| 6,712,155 B1 | 3/2004 | Dufty |
| 6,726,941 B2 | 4/2004 | Ethington, Jr. et al. |
| 6,793,704 B2 | 9/2004 | You |
| 6,844,293 B1 | 1/2005 | Kirby et al. |
| 6,855,763 B1 | 2/2005 | Kirby et al. |
| 6,887,385 B2 | 5/2005 | Tonkin et al. |
| 7,025,067 B2 | 4/2006 | Chatterjee |
| 7,045,063 B2 | 5/2006 | Zhang et al. |
| 7,094,350 B2 | 8/2006 | Inaba et al. |
| 7,097,830 B2 | 8/2006 | Nautiyal et al. |
| 7,109,267 B2 | 9/2006 | Kirby et al. |
| 7,144,439 B2 | 12/2006 | Isami |
| 7,172,637 B2 | 2/2007 | Weissman et al. |
| 7,179,859 B2 | 2/2007 | Kirby et al. |
| 7,188,666 B2 | 3/2007 | Lee et al. |
| 7,198,720 B2 | 4/2007 | Inaba et al. |
| 7,234,273 B2 | 6/2007 | Aiba |
| 7,329,421 B2 | 2/2008 | Dnyaneshwar |
| 7,347,037 B2 | 3/2008 | Sundberg et al. |
| 2002/0100211 A1 | 8/2002 | Vahrmeyer |
| 2003/0022358 A1 | 1/2003 | Hall |
| 2003/0084611 A1 * | 5/2003 | Weder .................. 47/65.7 |
| 2004/0194374 A1 | 10/2004 | Gatliff |
| 2006/0054099 A1 | 3/2006 | Okamoto |
| 2006/0117653 A1 | 6/2006 | Werth |
| 2006/0243011 A1 | 11/2006 | Someus |
| 2007/0074496 A1 | 4/2007 | Sundberg et al. |

FOREIGN PATENT DOCUMENTS

| | | |
|---|---|---|
| CN | 1056275 | 11/1991 |
| CN | 1251857 | 5/2000 |
| CN | 1310151 | 8/2001 |
| CN | 1310156 | 8/2001 |
| CN | 1425742 | 6/2003 |
| CN | 1548500 | 11/2004 |
| CN | 1563277 | 1/2005 |
| CN | 1632060 | 6/2005 |
| CN | 1664065 | 9/2005 |
| CN | 1689408 | 11/2005 |
| CN | 1858158 | 11/2006 |
| CN | 2898027 Y | 5/2007 |
| CN | 101045661 | 10/2007 |
| CN | 101070157 | 11/2007 |
| DE | 3815776 | 11/1989 |
| EP | 1413190 | 4/2004 |
| EP | 1769949 | 4/2007 |
| GB | 1406093 | 9/1975 |
| GB | 2152345 | 8/1985 |
| GB | 2390289 | 1/2004 |
| JP | 64003092 | 1/1989 |
| JP | 3141184 | 6/1991 |
| JP | 4109964 | 4/1992 |
| JP | 7289075 | 11/1995 |
| JP | 9255465 | 9/1997 |
| JP | 10017390 | 1/1998 |

| | | |
|---|---|---|
| JP | 2000160163 | 6/2000 |
| JP | 2000212561 | 8/2000 |
| JP | 2000313683 | 11/2000 |
| JP | 2001172642 | 6/2001 |
| JP | 2001302381 | 10/2001 |
| JP | 2002114976 | 4/2002 |
| JP | 2002265292 | 9/2002 |
| JP | 2003094098 | 4/2003 |
| JP | 2004066209 | 3/2004 |
| JP | 2004195413 | 7/2004 |
| JP | 2004251617 | 9/2004 |
| JP | 2004261021 | 9/2004 |
| JP | 2006143981 | 6/2006 |
| JP | 2006254894 | 9/2006 |
| JP | 2006265504 | 10/2006 |
| JP | 2007-016011 | 1/2007 |
| JP | 2007043913 | 2/2007 |
| JP | 2007332274 | 12/2007 |
| JP | 2008-056509 | 3/2008 |
| KR | 20010000251 | 1/2001 |
| KR | 20010005457 | 1/2001 |
| KR | 20010018073 | 3/2001 |
| KR | 20020087009 | 11/2002 |
| KR | 20030066487 | 8/2003 |
| KR | 20040009701 | 1/2004 |
| KR | 20040043600 | 5/2004 |
| KR | 20040048758 | 6/2004 |
| KR | 20040065129 | 7/2004 |
| KR | 20040095578 | 11/2004 |
| KR | 20060033756 | 4/2006 |
| KR | 20060090042 | 8/2006 |
| PT | 103249 | 9/2006 |
| RU | 2291104 | 1/2007 |
| WO | WO 94/26093 | 11/1994 |
| WO | WO 95/07018 | 3/1995 |

OTHER PUBLICATIONS

Written Opinion for International (PCT) Patent Application No. No. PCT/US08/071966, mailed Aug. 1, 2008.

Author Unknown, "ActiveAir Charcoal Filter Canister", internet catalog advertisement, available at http://www.planetnatural.com/site/activeair-charcoal-filter.html, printed on Sep. 9, 2008, p. 1.

Author Unknown, "A comprehensive sustainable solution", internet article, http://www.eprida.com/hydro/Page_Files/hydromain.htm, printed Apr. 8, 2008, pp. 1-4.

Author Unknown, "Bio-Char", internet blog, http://www.garyjones.org/mt/archives/000273.html, Muck and Mystery, Feb. 18, 2006, pp. 1-6.

Author Unknown, "Charcoal Fertilizer Process", internet diagram, http://www.energymanagertraining.com/fertilizer/pdf/Charcoal%20Fertilizer%20Process.pdf, date unknown, p. 1.

Author Unknown, "Gro-Safe® Activated Carbon", internet article, http://www.buyactivatedcharcoal.com/gro_info?OVRAW=charcoal%20fertilizer&OVKEY, copyright 2006-2008, printed Apr. 8, 2008, pp. 1-4, Super Natural Charcoal.

Brown, et al., "Farming that improves the environment", Iowa State University News Service, internet article, http://wvvw.public.iastate.edu/~nscentral/news/05/novicharcoal.shtml, Nov. 7, 2005, pp. 1-2, University Relations, Ames, Iowa.

Chandler, "Down-to-earth fix for the carbon crisis", NewScientist, Dec. 2, 2006, p. 13.

Doty, "Renewable Fertilizer: New Fertilizer Offer Carbon Sequestration Benefit", internet article available at http://www.americanenergyindependence.com/fertilizer.html, printed Apr. 8, 2005, pp. 1-3.

Haard, "Learning to Use Wood Charcoal in Farming at a Northwestern Washington Native Plant Nursery", internet posting, http;//terrapreta.bioenergylists.org/?q=haardcharcoal, Feb. 20, 2007, pp. 1-7.

Hamilton, "The Case for Burying Charcoal", Technology Review, internet article, http://technologyreview.com/Energy/18589/?a=f,%20April%2026,%202007, Apr. 26, 2007, pp. 1-3, MIT.

Lehmann, "A Handful of Carbon", Nature, May 10, 2007, pp. 143-144, vol. 447, Nature Publishing Group.

Lipow, "Charcoal agriculture: not ready for primetime", internet post, http://gristmill.grist.org/story/2007/5/19/15043/2010, May 20, 2007, p. 1, Grist Magazine, Inc.

Nishio, "Microbial Fertilizers in Japan", (Abstract) National Institute of Agro-Environmental Sciences, date unknown, pp. 1-12.

Struve, et al., "Using Physical and Chemical Fertilizer Barriers in Agricultural Applications as a Possible Method to Optimize Agricultural Fertilizer Use and/or Reduce Nitrogen Leaching from Container-Grown Crops", Proposal to the Department of Horticulture and Crop Science at The Ohio State University, date unknown, pp. 1-2.

International Preliminary Report on Patentability for International (PCT) Patent Application No. PCT/US08/071966, mailed Feb. 18, 2010.

* cited by examiner

METHOD AND APPARATUS FOR REDUCING FERTILIZER USE IN AGRICULTURAL OPERATIONS

CROSS-REFERENCE TO RELATED APPLICATIONS

This Application claims the benefit of U.S. Provisional Application No. 60/954,005, filed Aug. 4, 2007, the entire disclosure of which is hereby incorporated herein by reference.

FIELD OF THE INVENTION

The present invention relates to agriculture and more particularly to the use of certain materials in agriculture to reduce the amount of fertilizer required to effectively grow various plants and to diminish the amount of fertilizer contamination of ground water.

BACKGROUND

In nursery operations, among other agricultural pursuits, the utilization of large amounts of water and fertilizer are commonplace. While the utilization of such large quantities of water and fertilizer help to produce better agricultural products, there are serious side-effects associated with using fertilizer.

Escaping water carries much of the fertilizer with it. This not only increases the amount of fertilizer that is necessary to effectively fertilize the plant, thereby increasing the costs incurred by the plant grower, but the run-off can be a dangerous pollutant and can lead to the creation of dead zones. Hundreds of the world's coastal regions have dead zones, which are oxygen-depleted areas where many forms of aquatic life cannot survive. Fertilizer run-off from land is increasing the number, size, duration and severity of dead zones across the globe. This is mainly because the use of fertilizers in agriculture is increasing.

Nitrogen, which, makes up about 78% of the Earth's atmosphere, is an inert gas but it has more reactive forms. One of these comes from making fertilizers, using the Haber-Bosch process, which converts nitrogen gas into ammonia. Although some of the fertilizer used on fields is taken up by plants and then by the animals that eat them, most of it accumulates in the soil before being washed to the coast and eventually to the ocean.

SUMMARY

It is therefore an object of the present invention to solve the shortcomings of the prior art while also reducing the amount of fertilizer consumed in agricultural pursuits. More particularly, the need has been recognized for a plant or root container that allows water to pass through but prevents or otherwise inhibits the passage of certain chemicals such as fertilizer, nutrients, pesticides, and other elements (e.g., Sodium, Potassium, Nitrogen, Phosphorus, etc.). Additionally, the need for a material that can be used in such plant or root containers has also been recognized.

It is therefore one aspect of the present invention to provide a semi-permeable membrane or similar material that can be used to encompass a root area of a plant. The semi-permeable membrane may be adapted to allow the passage of water while entrapping fertilizer and/or other chemicals and nutrients. The entrapment of the fertilizer and/or other chemicals and nutrients serves two purposes. First, by trapping the fertilizer and/or other chemicals and nutrients in the semi-permeable membrane, the plant is able to continue absorbing the previously provided fertilizer and/or other chemicals and nutrients because the plant's root system may also be capable of entering pores of the membrane that have entrapped the fertilizer and/or other chemicals and nutrients. This helps reduce the amount of fertilizer and/or other chemicals and nutrients required to effectively grown the plant, which also helps reduce operational costs.

Second, by trapping the fertilizer and/or other chemicals and nutrients, the amount of fertilizer run-off can be reduced, thereby reducing the otherwise adverse effects of fertilizer run-off. This fact is particularly useful for planting operations located in areas that have strict guidelines related to the allowable amount of fertilizer run-off.

The semi-permeable membrane may be constructed from any type of material that allows the passage of water but contains and entraps particulates and other matter carried by the water. Certain types of semi-permeable membranes that can be used in accordance with at least some embodiments of the present invention include those that are currently used in dialysis. One exemplary material that may be utilized to construct the semi-permeable membrane is activated charcoal. Activated charcoal or carbon is particularly useful because it is capable of entrapping many types of chemicals, fertilizer, nutrients, and other beneficial plant chemicals while allowing water to pass therethrough.

The applications in which the semi-permeable membrane may be employed can vary. The form in which the semi-permeable is employed may also vary from application to application. For instance, in accordance with at least one embodiment of the present invention, the semi-permeable membrane may be utilized for large rooted plants, such as trees. The semi-permeable membrane may be provided as a part or layer of a root bag or similar planter in which the tree is initially grown. The size and thickness of the semi-permeable membrane may vary depending upon the size of the tree around which the root bag is planted. In a root bag embodiment, the membrane is employed as a temporary aid to the growth of the tree.

Larger planters and other permanent plant locations may also be equipped with the semi-permeable membrane in accordance with at least some embodiments of the present invention. In one embodiment, the larger planter or permanent plant location may include one or more layers of the semi-permeable membrane. For instance, a permanent planter may comprise a first semi-permeable membrane layer for retaining the fertilizer and/or other chemicals and nutrients close to the plant's root system and a second semi-permeable membrane layer for restricting any fertilizer and/or other chemical and nutrient run-off from the planter. Both the first and second semi-permeable membrane layers may be monitored for their absorption of fertilizers and/or other chemicals and nutrients. If it is determined that one of the layers has become saturated with particulates and its effective entrapment of the fertilizers and/or other chemicals and nutrients has diminished, then that layer as well as the other layer may be replaced or otherwise recharged.

The semi-permeable membrane may also be utilized in large acreage agricultural applications (e.g., farms, golf-courses, city gardens, etc.). In these types of applications, the root systems of the plants tend to stay relatively shallow as compared to the root systems of trees. For instance, the roots of grass on a golf course tend to only extend about 3 to 4 inches below the surface. Thus, in accordance with at least some embodiments of the present invention, a semi-permeable membrane layer may be deposited at or below the root system and may be deposited relatively uniformly across the acreage. Of course, the orientation of the semi-permeable membrane layer may depend upon surface features (e.g., hills, valleys, ditches, gulches, etc.). For example, if the surface in which the semi-permeable membrane is to be used is relatively flat, then a membrane layer having a substantially uniform thickness may be utilized. Alternatively, if the surface undulates due to a hill, then it may be preferable to set up columns of the semi-permeable membrane in the root system or it may be preferable to lay down a membrane layer with a non-uniform thickness (e.g., with a thickness that is greater toward the lower elevation of the hill).

When constructing a semi-permeable membrane layer for applications where a relatively large amount of area needs to be covered, it may be advantageous to create a semi-permeable mulch by combining shredded paper and/or fiber and activated charcoal. The semi-permeable mulch may be spread across the acreage before seeds are planted or before a sod layer is placed on the ground. Alternatively, a slurry may be created by combining the semi-permeable mulch with water or some other solvent. The slurry may be advantageously utilized to embed the semi-permeable layer in an existing plant system (e.g., in an existing golf course). While the slurry may be more easily deposited in-situ than a mulch, one skilled in the art may also envision methods of directly embedding the semi-permeable mulch in an existing root system.

In embodiments where a fiber is used in connection with the activated charcoal, embodiments of the present invention may be provided whereby a membrane is made out of fiber with the charcoal adhering to it. In such an embodiment, a membrane composed of an active layer of charcoal or resin may be supported or otherwise held in place by two or more structural layers, which can be made of paper, carton, fiber, etc. This membrane itself can be shaped into any form for various agricultural applications.

As noted above, more than one semi-permeable membrane layer may be utilized for a particular plant or plant system. One or both of these layers may extend above ground level, or be placed above ground level in the first place thereby preventing surface run-off in addition to preventing the run-off through the ground. Additional layers may also be provided depending upon the application and desired level of fertilizer and/or other chemical and nutrient entrapment. In accordance with at least one embodiment of the present invention, a root container may include four different layers: (1) a structural outer layer; (2) an outer semi-permeable layer; (3) and inner semi-permeable layer; and (4) a structural inner layer. This sandwich of layers may function as a relatively inexpensive semi-permeable membrane that can be configured in multiple ways to tailor its permeability and selective filtering characteristics for several different applications. An inexpensive biodegradable water permeable membrane layer can be formed out of loose-packed paper pulp and/or fiber or from recycled paper. The permeability of these layers can be controlled by thickness, density, and/or non-toxic additives. The active layer can be used to control diffusion of chemicals and/or fertilizer. This active layer may include activated charcoal in accordance with at least some embodiments of the present invention.

The movement of chemicals through dirt and multi-layer membranes can be controlled by chemical concentration gradients, such that the chemicals will diffuse from a higher concentration toward a lower concentration, with the diffusion rate controlled by permeability. Thus, a high concentration of fertilizer in the dirt (just after fertilizer application) will be carried by water flowing outward when the plant is watered. Most of the fertilizer will pass through the relatively thin inner permeable layer but will be absorbed by the active layer. Later, as the fertilizer in the dirt is taken up by the plant roots, the concentration gradient will reverse such that the fertilizer is most concentrated in the active layer and less so in the dirt. At this point, the chemical diffusion reverses direction and the active layer slowly gives up its chemicals, which flow back into the lower concentration in the dirt. Preferably, the inner permeable layer is more permeable than the outer one (e.g., being thinner) and therefore the flow of chemicals inward predominates over leakage outward.

In accordance with at least some embodiments of the present invention, a semi-permeable membrane is provided that exhibits about 97.5% absorption. More specifically, the semi-permeable membrane may absorb up to about 97.5% of the fertilizer and/or chemicals and nutrients (e.g., Nitrate) that are carried by the water. Thus, 97.5% less fertilizer, chemicals, and nutrients may be used to effectively grow plants. As can be appreciated, however, embodiments of the present invention are not limited to these levels of absorption. Greater or lesser levels of absorption may be achieved depending upon the type of materials that are used to create the semi-permeable membrane.

During its operational life span, the semi-permeable membrane (e.g., charcoal) may collect more and more mineral nutrients in an exchangeable form. Once collected, the semi-permeable membrane may act as a nutrient-loaded activated charcoal (e.g., a type of slow release fertilizer). The advantage of the charcoal is that nutrients are released in response to plant demand and would not be directly affected by soil moisture content or temperature (two primary factors that currently effect release rate in current slow-release fertilizers). Thus, the release rate would match plant demand and result in high fertilizer efficiency.

To this end, a fertilizing pot or planter may be provided in accordance with at least some embodiments of the present invention. The fertilizing pot or planter may comprise a fertilizer preloaded semi-permeable membrane (i.e., fertilizer may be incorporated into the membrane prior to planting the plant in the membrane). The roots of the plant may then be able to grow into the semi-permeable membrane to extract the loaded as well as subsequently collected fertilizer on an as-needed basis. The amount of fertilizer that is initially incorporated into the semi-permeable membrane may vary depending upon the type of application in which the membrane will be used. As an exemplary ratio, the membrane may be loaded to between about 5% to about 75% of its saturation level with fertilizer and other nutrients. In one embodiment, the membrane may be loaded to about 50% of its saturation level with fertilizer and other nutrients. In another embodiment, the membrane may be loaded to the point of saturation (e.g., 100% of its carrying capability).

The remaining capacity, if any, will be available for entrapping subsequently added fertilizers and/or other chemicals and nutrients. The amount of subsequently added fertilizers and/or other chemicals and nutrients may vary, however, based on the rate that the pre-loaded nutrients are extracted from the membrane by the plant roots. In accordance with one embodiment of the present invention, fertilizers and/or other chemicals and nutrients may be added to a plant at a rate that is substantially similar to the rate at which the plant roots extract the fertilizers and/or other chemicals and nutrients from the membrane. The extraction rate may be determined based on empirical tests conducted for certain types of plants with certain types and configurations of membranes.

Another fertilizing pot may include a plug at its drain point that incorporated a membrane in accordance with at least some embodiments of the present invention. In one embodiment, the plug may include a membrane that is preloaded with fertilizer.

The Summary is neither intended nor should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

Figure 1A:
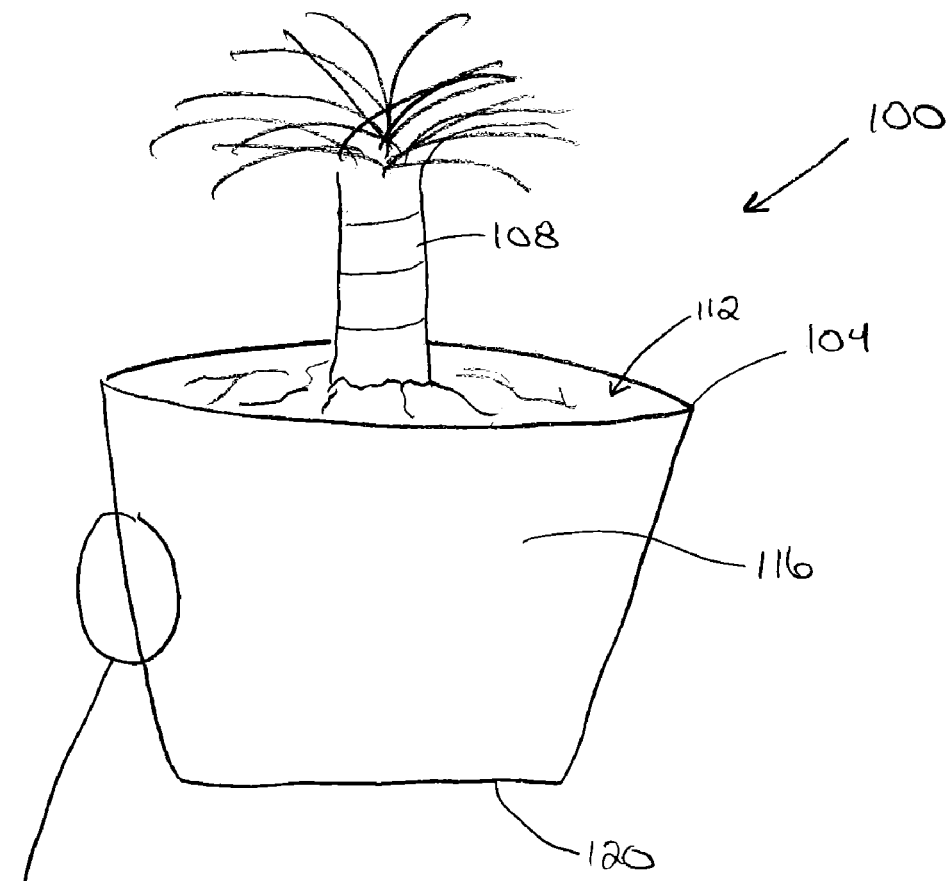
FIG. 1A is a diagram depicting an exemplary plant container in accordance with at least some embodiments of the present invention.
Figure 1B:
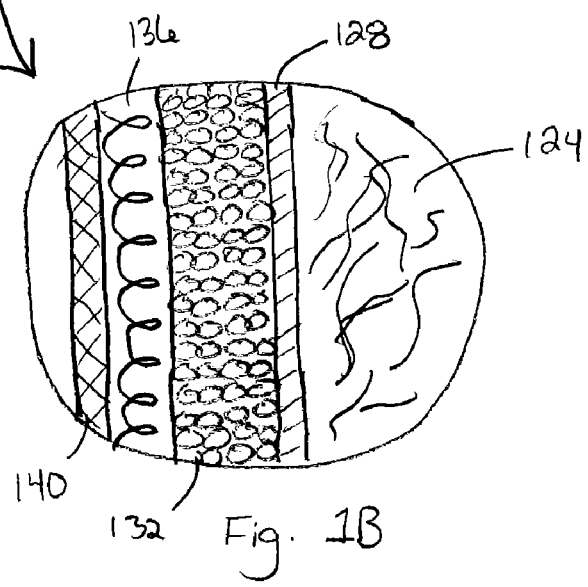
FIG. 1B is an exploded cross-sectional view of the container in accordance with at least some embodiments of the present invention.

Referring initially to FIGS. 1A and 1B, an exemplary root container 100 will be described in accordance with at least some embodiments of the present invention. The root container 100 may include a top portion 104 and bottom portion 120 interconnected with a sidewall 116. In accordance with at least one embodiment of the present invention, the container 100 may comprise a substantially cylindrical configuration. Thus, the top 104 and bottom 120 portions may be circular in nature with the sidewall 116 connecting traversing the outer circumference of both. The container 100 may be adapted to assume other non-cylindrical configurations without departing from the scope of the invention. For example, the container 100 may alternatively comprise a box-type configuration with several sidewalls 116.

The top portion 104 may be open and adapted to receive a plant 108. The plant 108 may be planted in soil 112 that is contained by the sidewall 116 and bottom portion 120 of the container 100. The roots of the plant 108 are allowed to grow throughout the soil 112. Although the container 100 is depicted as an above-ground planter, one skilled in the art will appreciate that the container 100 could also be adapted for use as an in-ground container because it is both sturdy enough to be self supporting while it is also bio-degradable for use in-ground.

As can be seen in FIG. 1B, the containing portions (i.e., the sidewall 116 and bottom 120) may have a unique structure that facilitates the passage of water while restricts the passage of other particulates (e.g., fertilizer, chemicals, and/or nutrients such as Sodium, Potassium, Nitrogen, and Phosphorus). In accordance with at least one embodiment of the present invention, the bottom 120 and sidewall 116 may have a similar construction in that both elements may be constructed to selectively entrap and capture various particulates that are carried by water that is allowed to pass therethrough. Alternatively, the bottom 120 and sidewall 116 may have dissimilar constructions such that only water is allowed to pass through the bottom 120. In such a configuration, however, both the bottom 120 and sidewall 116 may still be adapted to entrap and store particulates that can be used by the roots 124 of the plant 108.

In accordance with at least one embodiment of the present invention, the containing portions may include a construction that comprises an inner support layer 128, a first semi-permeable layer 132, a second semi-permeable layer 136, and an outer support layer 140. The inner support layer 128 may be constructed of loose-packed paper pulp or some other bio-degradable material. The inner support layer 128 may also be adapted to allow the passage of water and particulates therethrough.

The first semi-permeable layer 132, which is adjacent to the inner support layer 128, may be constructed of a material that is operable to allow water to pass there through while selectively entrapping and containing fertilizer that is carried by the water such that the fertilizer is maintained within proximity to a plant root 124 located near the material. The first semi-permeable layer 132 may also be adapted to entrap and contain other particulates that can either (a) act as a pollutant to water escaping from the container 100 or (b) act as a beneficial nutrient/chemical to the plant 108. In accordance with at least some embodiments of the present invention, the first semi-permeable layer 132 is constructed of activated charcoal, flyash, a resin, or some other sorbent material that is capable of containing particulates without disturbing the flow of water therethrough.

The second semi-permeable layer 136, which is adjacent to the first semi-permeable layer 136, may also be constructed of a material similar to the first semi-permeable layer 132. Collectively, the first 132 and second 136 semi-permeable layers act as a trap for fertilizer and other nutrients that are added to the plant 108 in an attempt to make the plant 108 grow effectively. The fertilizer and other particulates that are trapped and contained by the semi-permeable layers 132, 136 may be accessed by the plant's roots 124 that have grown through the inner support layer 128 and into the semi-permeable layers 132, 136. Thus, the fertilizer and other nutrients can be consumed by the plant 108 on an as-needed basis without requiring the continual addition of fertilizer and other nutrients to the surface of the soil 112.

In accordance with at least one embodiment of the present invention, the first semi-permeable layer 132 may comprise a permeability that is different from the permeability of the second semi-permeable layer 136. Accordingly, a permeability gradient may be created via the utilization of multiple (e.g., two, three, four, five, or more) semi-permeable layers 132, 136. In one embodiment, the first semi-permeable layer 132 is more permeable than the second semi-permeable layer 136. This allows the flow of chemicals inward (i.e., toward the roots 124) to predominate over leakage outward (i.e., away from the roots 124).

The outer support layer 140 may be adapted to contain the other layers of the container 100. In accordance with at least one embodiment of the present invention, the outer support layer 140 may be adapted to allow water to pass therethrough. In an alternative embodiment, the outer support layer 140 may be adapted to restrict the flow of water therethrough. As noted above, the functionality of the outer support layer 140 may vary depending upon its location within the container 100. For example, the outer support layer 140 of the bottom portion 120 may be adapted to allow the passage of water while the outer support layer 140 of the sidewall 116 may be adapted to restrict the passage of water.

The order of the layers in the container may also be altered within the spirit of the present invention. For example, one alternative configuration of layers may provide that the inner most layer (i.e., the layer adjacent to the soil 112) is a semi-permeable layer and the inner support layer 128 may be provided between the first and second semi-permeable layers 132, 136, respectively. As another example, the inner support layer 128 may be removed, leaving only the semi-permeable layers 132, 136 and the outer support layer 140. As yet another example, both support layers 128, 140 may be removed and the semi-permeable layers 132, 136 may be the only layers provided in proximity to the roots 124. This particular configuration may be particularly useful in situations where the plant 108 is placed in the ground and the semi-permeable layers 132, 136 separate the roots 124 of the plant 108 from the rest of the soil. Alternatively 132 and 136 can be combined into one functionally active layer.

The thicknesses of each layer may vary depending upon the application and the type of plant 108 that is being contained. As one example, the inner support layer 128 may comprise a thickness of between about 1 mm and about 5 mm, the first semi-permeable layer 132 may comprise a thickness of between about 1 mm and about 10 mm, the second semi-permeable layer 136 may comprise a thickness of between about 1 mm and about 20 mm, and the outer support layer 140 may comprise a thickness of between about 1 mm and about 10 mm. An indication may be provided on the outside of the outer support layer 140 that describes the thickness(es) of the semi-permeable layer(s) 132, 136. In one embodiment, a color coding scheme may be employed whereby the color of the outer support layer 140 or a color on the outer support layer 140 indicates the thickness of one or both semi-permeable layers 132, 136.

Figure 2:
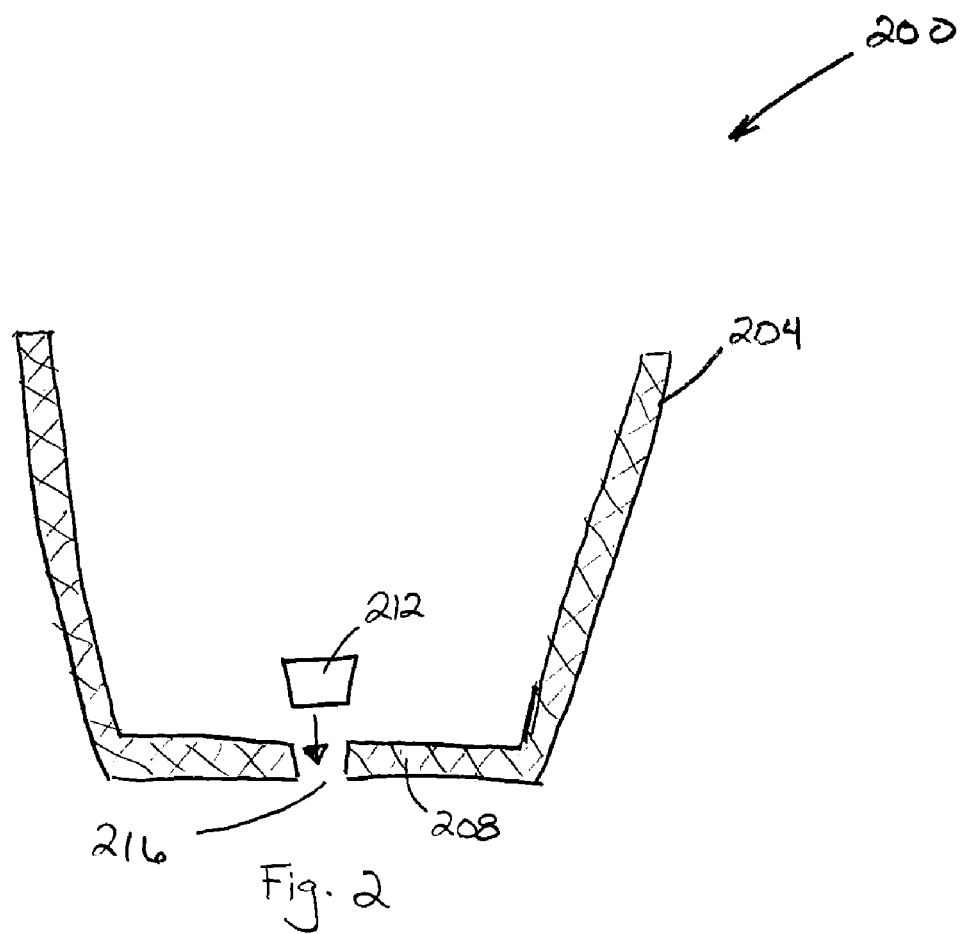
FIG. 2 is a cross-sectional view of a plant container having a drain area and plug in accordance with at least some embodiments of the present invention.

With reference now to FIG. 2, an alternative configuration of a container 200 will be described in accordance with at least some embodiments of the present invention. In the depicted embodiment, the container 200 may include sidewalls 204 and a bottom portion 208 that are impermeable to water. In other words, the container 200 walls 204 and bottom portion 208 do not allow the passage of water therethrough by design. A hole 216 may be provided in the bottom portion 208 to facilitate the passage of water away from the roots of the plant. Without the provision of the hole 216, water would collect at the roots and eventually begin rotting the plant. The hole 216 may be adapted to receive a plug 212 that is constructed in accordance with at least some embodiments of the present invention.

Figure 3:
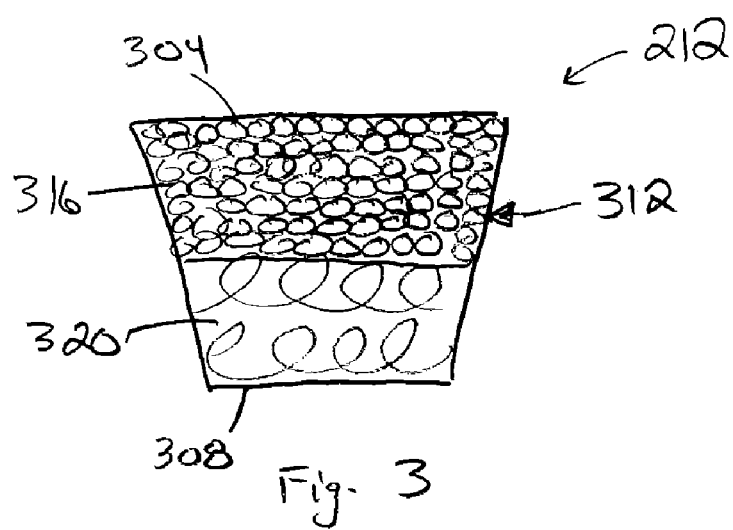
FIG. 3 is an exploded cross-sectional view of a plant container plug in accordance with at least some embodiments of the present invention.

A more details cross-sectional view of the plug 212 can be seen in FIG. 3. In accordance with at least one embodiment of the present invention, the plug 212 may comprise a top portion 304, bottom portion 308, and a side portion 312. The plug 212 may be tapered from the top portion 304 down to the bottom portion 308 such that it is secured by friction in the hole 216. In other words, the plug 212 may have a wider cross-sectional area at the top than at the bottom. The plug 212 may be constructed to facilitate the passage of water therethrough. At the same time, the plug 212 may also be constructed to entrap and contain particulates that are carried by water. Examples of such particulates include, but are not limited to, fertilizer, chemicals, nutrients, and other beneficial elements. Another function of the plug 212 is to restrict the soil contained in the container 200 from escaping through the hole 216.

In accordance with at least one embodiment of the present invention, the plug 212 may comprise a first layer 316 and a second layer 320. One or both of the layers 316, 320 may be constructed of a semi-permeable material (e.g., activated charcoal) that traps fertilizers and other particulates that would otherwise be carried away from the plant roots with water. In the event that only one of the layers 316, 320 is constructed of the semi-permeable material, the other semi-permeable layer 316, 320 may be adapted to allow the passage of water and fertilizers. In an embodiment where both of the layers 316, 320 are constructed of a semi-permeable material, each layer 316, 320 may comprise different permeabilities. The difference in permeability may be achieved in a number of different ways. One way to vary the permeability between layers 316, 320 is to use different materials for the layers. For instance, the first layer 316 may be constructed of activated charcoal while the second layer 320 may be constructed of a resin or the like. Another way to vary the permeability between layers 316, 320 is to alter the density between layers. As an example, the first layer 316 may comprise a pure semi-permeable material whereas the second layer 320 may comprise a combination of the semi-permeable material and a filler material such as pulp, shredded paper, or some other filler that decreases the overall density of the second layer 320. Combinations of these permeability altering mechanisms may also be utilized.

One advantage to utilizing a plug 212 with a semi-permeable material is that the plug 212 can be easily monitored and replaced. The frequency with which the plug 212 is replaced may vary depending upon how quickly the layers 316, 320 become saturated with particulates and other elements that are carried by water and trapped by the plug 212. The plug 212 may also be replaced each time a plant is removed from the container 208. The reusable container 200 may therefore be employed to contain a number of different plants.

Figures 4A, 4B:
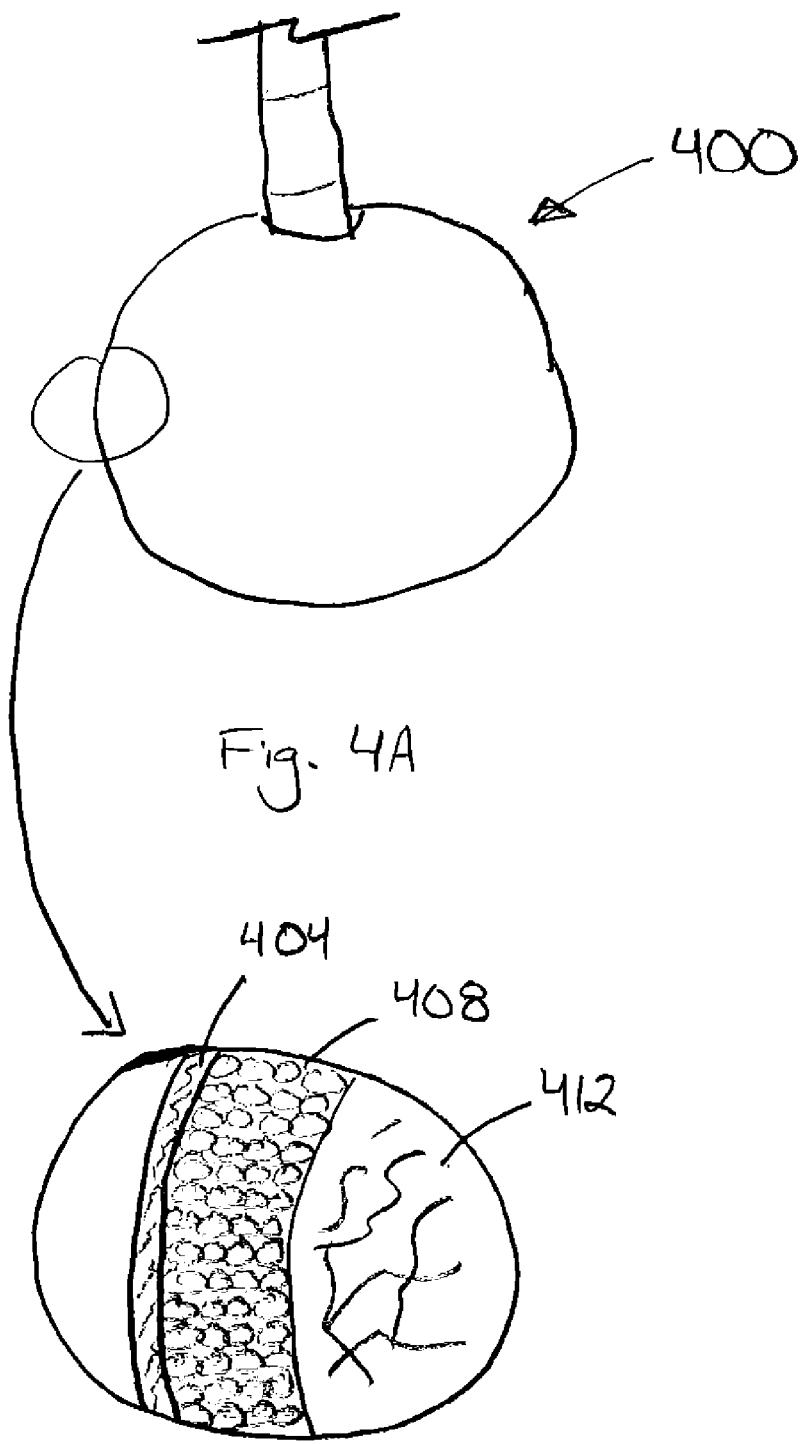
FIG. 4A is a diagram depicting a root bag in accordance with at least some embodiments of the present invention.
FIG. 4B is an exploded cross-sectional view of the root bag in accordance with at least some embodiments of the present invention.

Referring now to FIGS. 4A and 4B a root bag 400 will be described in accordance with at least some embodiments of the present invention. The root bag 400 is another example of a root container that may be utilized in accordance with embodiments of the present invention. The root bag 400 may comprise two or more layers that are adapted to surround and support the root structure 412 of the plant. The root bag 400 may include an outer layer 404 and an inner layer 408. The outer layer 404 may comprise a burlap bag or some similar material that can be used to wrap the roots 412 of the plant. The inner layer 408 may comprise a semi-permeable material 408 that is capable of trapping fertilizer and other elements that are found to be beneficial to plant growth. The roots 412 of the plant may be capable of growing into the inner layer 408 such that the trapped elements can be extracted by the plant.

Although the root bag 400 is only depicted as having two layers, one skilled in the art will appreciate that greater or fewer layers may be utilized to create a container that is adapted to selectively restrict the passage of fertilizer and other agriculturally beneficial elements away from the roots 412. As one example, additional semi-permeable layers may be provided to enhance the efficacy of fertilizer entrapment. As another example, a single layer may be utilized whereby the single layer acts both as a structural and semi-permeable layer. In one embodiment, a burlap bag or a similar type of otherwise permeable material may be laced or saturated with a semi-permeable material (e.g., charcoal dust, a charcoal mulch, or a charcoal slurry), such that the semi-permeable material integrates itself within the bag, thereby causing the structural layer to also act as the semi-permeable layer. Alternatively, a semi-permeable slurry may be created that is sprayed/applied to the bag material (or a similar material such as paper used in other configurations of the root container). The slurry may integrate with the bag or paper. Then, the bag or paper may be allowed to dry at which point a semi-permeable support material is created. The semi-permeable support material may then be used as a support layer in the root container and/or as a semi-permeable layer in the root container.

Referring now to FIGS. 5-8, various membrane layer configurations will be described in accordance with at least some embodiments of the present invention. The use of a semi-permeable material is not limited to agricultural applications whereby the root system of a single plant (e.g., a shrub, tree, flower, etc.) is encapsulated by a semi-permeable layer. Rather, a semi-permeable material may also be advantageously utilized in acreage applications where the plant and root system is highly dispersed across a relatively large area. As one example, the semi-permeable material may be utilized in golf courses to maintain fertilizer and other elements that are applied to the surface relatively close to the root system of the golf course grass. As another example, the semi-permeable material may be utilized in farms to maintain fertilizer and other elements relatively close to crop roots.

Figure 5:
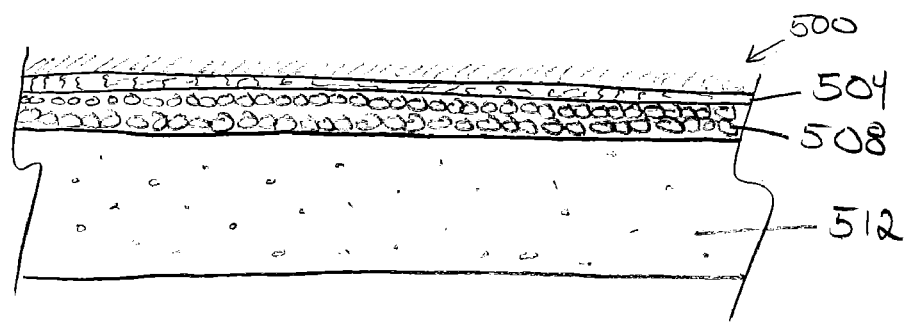
FIG. 5 is a cross-sectional view of a first membrane layer orientation in accordance with at least some embodiments of the present invention.

In a first configuration depicted in FIG. 5, a plant system 500 is shown with a semi-permeable layer 508 provided just below a root layer 504. The semi-permeable layer 508 may comprise a semi-permeable material that is capable of entrapping and containing fertilizer as well as other beneficial elements near the root layer 504. The root layer 504 may then integrate itself into the semi-permeable layer 508 such that there is no clear division between the two. In other words, as the roots 504 begin to grow into the semi-permeable layer 508, the two layers may integrate into a single layer.

The semi-permeable layer 508 may be provided on top of the soil layer 512. The soil layer 512 is a typical soil layer that includes dirt or the like. The thickness of the semi-permeable layer 508 may range from about 1 inch to about 2 feet. In accordance with at least some embodiments of the present invention, the semi-permeable layer 508 may comprise a relatively uniform thickness (i.e., uniform within a tolerance of about +/−2 inches) across the entire area of application. In an alternative embodiment, the thickness of the semi-permeable layer 508 may vary depending upon surrounding land structure. For example, it may be advantageous to provide a thicker semi-permeable layer 508 in drainage areas whereas a less thick semi-permeable layer 508 may be provided on hilltops or the like.

Figure 6:
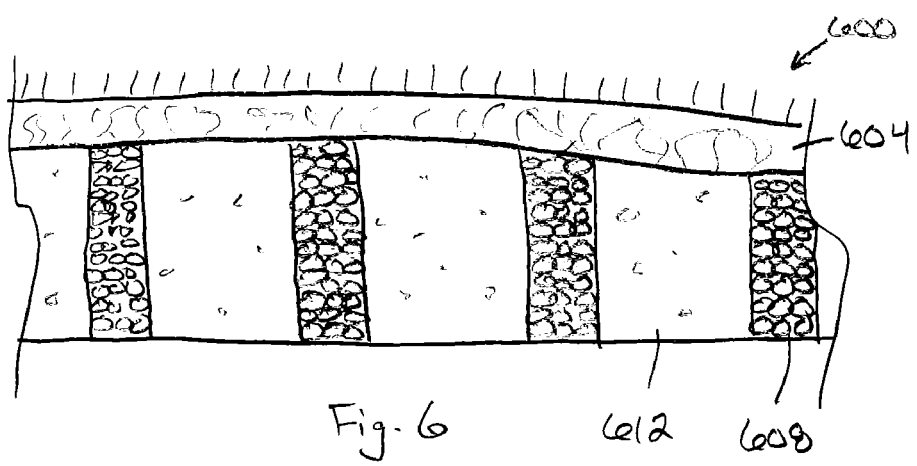
FIG. 6 is a cross-sectional view of a second membrane layer orientation in accordance with at least some embodiments of the present invention.

FIG. 6 shows an alternative configuration where the plant system 600 comprises a plurality of columns of semi-permeable layers 608 incorporated within the soil 612. The semi-permeable layers 608 may also be included partially or fully in the root system 604, although such a configuration is not depicted. The columns of semi-permeable layers 608 may behave similarly to other semi-permeable layers described herein and may include a semi-permeable material provided in accordance with at least some embodiments of the present invention. The spacing between columns 608 may vary depending upon the nature of the plant system 600 and more specifically the nature of the root system 604. In accordance with at least some embodiments of the present invention, the spacing (i.e., the thickness of each column of soil 612) between columns 608 may range from about 1 inch to about 12 inches. The columns 608 may be provided as a solid semi-permeable material, a mulch semi-permeable material, or a slurry semi-permeable material.

Figure 7:
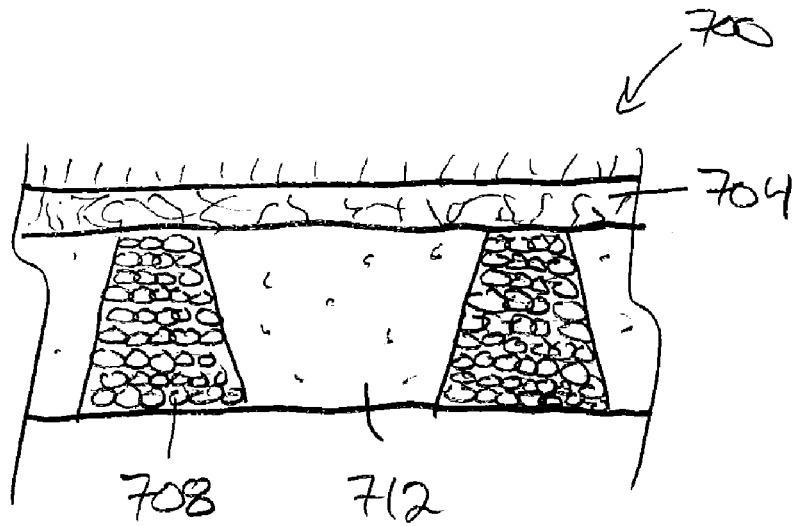
FIG. 7 is a cross-sectional view of a third membrane layer orientation in accordance with at least some embodiments of the present invention.

FIG. 7 shows yet another alternative configuration of the plant system 700 where the columns of semi-permeable layers 708 are not uniformly thick about their cross-section. Rather, the semi-permeable layers 708 may become relatively thicker as their depth increases. In accordance with at least one embodiment of the present invention, the semi-permeable layers 708 may have a first thickness near the root system 704 and a second thickness at their terminus in the soil 712. The first thickness (e.g., the thickness at the higher point) may be less than the second thickness (e.g., the thickness at the lower point). This may help to control the concentration gradient of fertilizers and other chemicals and nutrients that are trapped and contained by the semi-permeable layer 708. The depicted configuration may help to promote deeper root growth since more fertilizer and other beneficial elements will be located at the lower portions of the columns 708. One skilled in the art will appreciate that an opposite configuration of columns may also be employed such that the semi-permeable layers 708 are thicker near the root 704 and thinner within the soil 712.

Figure 8:
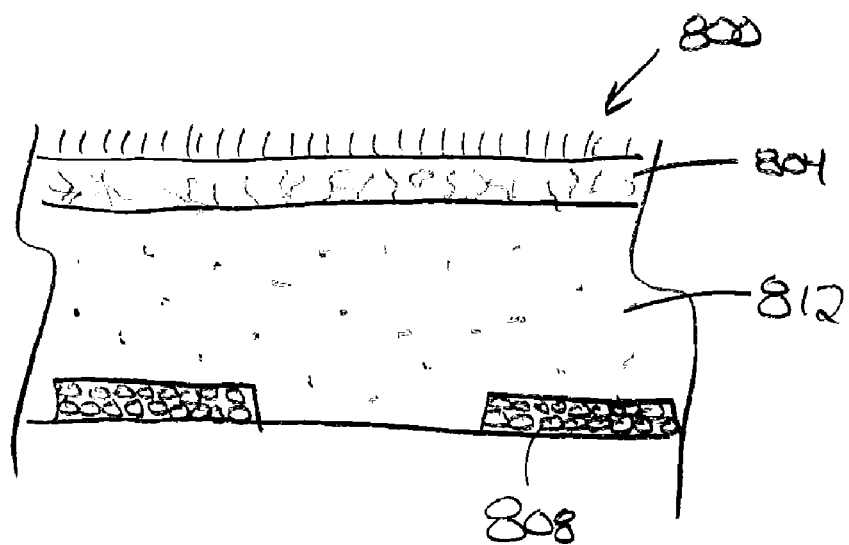
FIG. 8 is a cross-sectional view of a fourth membrane layer orientation in accordance with at least some embodiments of the present invention.

FIG. 8 shows still another alternative configuration of the plant system 800 where the semi-permeable layer 808 is separated from the root system 804. More specifically, columns of semi-permeable layers 808 may be provided that are vertically separated from the root system 804. Soil 812 may be provided between the semi-permeable layers 808 and the root system 804. The separation of the semi-permeable layer 808 from the root system 804 may serve two purposes. The first purpose is that such a separation may promote deeper root growth through the soil 812. The second purpose is that such a separation may allow the removal of the root system 804 from the soil 812 without affecting the configuration of the semi-permeable layer 808. The second purpose may prove particularly advantageous in sod farms and other farms where the plants are removed and sold, but it is desirable to reuse the same semi-permeable layer 808.

The semi-permeable layer may be provided in a number of different form factors. For example, the semi-permeable layer may be provided in a solid form factor. The solid semi-permeable layer may be laid down on the soil before the grass or other crop is laid down. Alternatively, the grass or crop may be lifted below its root layer (e.g., via a sod cutter), and the semi-permeable layer may be laid down and then the grass or crop may be replaced.

The semi-permeable layer may also be provided as mulch that is laid down before or after the grass or other crop is laid down. The mulch form factor may comprise part semi-permeable material (e.g., activated charcoal) and part filler material (e.g., shredded paper, paper Mache, woodchips, fiber etc.). The mulch may be easier to handle than a pure form of the semi-permeable material. Additionally, the composition of the mulch can be varied to alter the density of the semi-permeable layer that includes the mulch.

The semi-permeable layer may also be provided as a slurry that is a combination of at least a semi-permeable material and water. Preferably, the semi-permeable slurry may also include mulch or some other filler material that helps to control the viscosity of the slurry such that it can be more easily applied. One advantage to utilizing slurry is that it can be sprayed to a soil surface before grass or other crops are planted. The layer created by the slurry spray may be relatively more uniform than semi-permeable layers constructed with other form factors. Another advantage of utilizing slurry is that the slurry can be more easily deposited into an established crop, yard, or grassed area. More specifically, the slurry may be injected into the root system of a planted area. The slurry can then integrate itself within the root system where it can then dry and establish a semi-permeable layer.

A number of different methods and machines may be utilized to integrate a semi-permeable layer into an agricultural area. Examples of such machines and methods are described in US 2007/074,496; U.S. Pat. No. 7,347,037; EP 1,769,949; EP 1,413,190; U.S. Pat. No. 6,571,544; U.S. Pat. No. 4,579,363; U.S. Pat. No. 4,326,594; U.S. Pat. No. 6,712,155; U.S. Pat. No. 6,460,624; U.S. Pat. No. 6,505,687; U.S. Pat. No. 6,247,267; US 2006/117,653; U.S. Pat. No. 5,690,178; GB 2,390,289; and U.S. Pat. No. 5,884,570, the entire contents of which are hereby incorporated by reference in their entirety.

Figure 9:
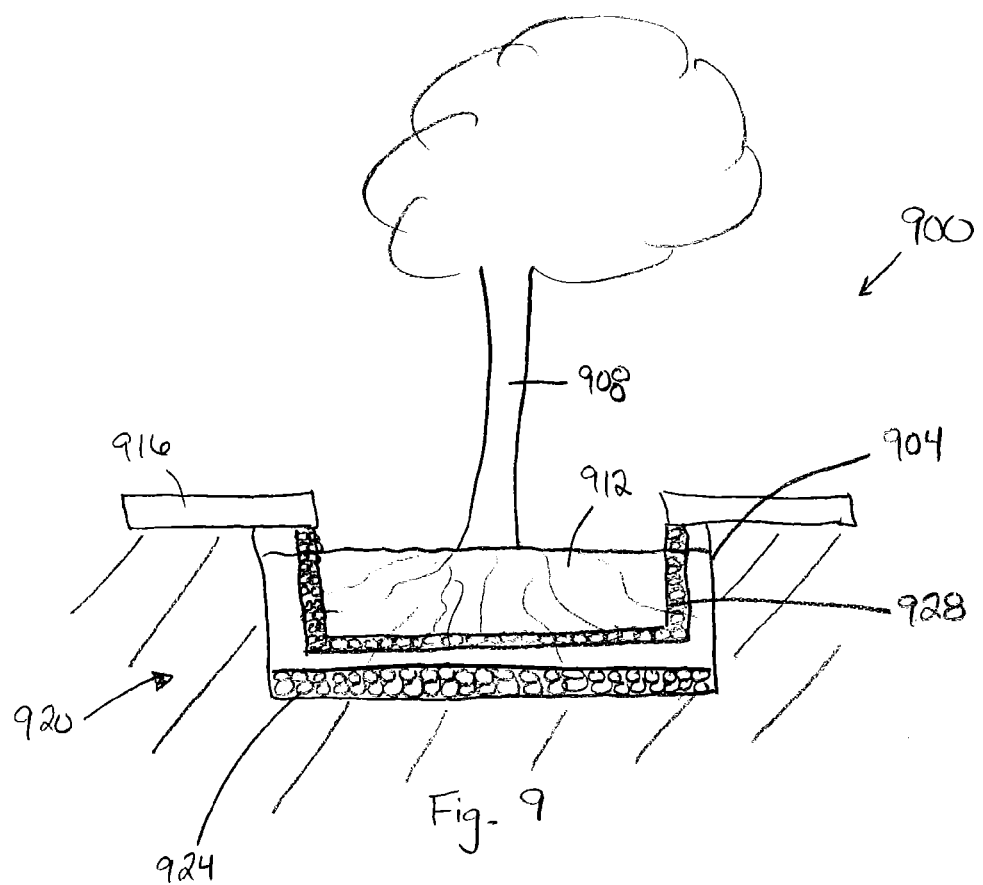
FIG. 9 is a cross-sectional view of an urban plant container in accordance with at least some embodiments of the present invention.

Referring now to FIG. 9, a root container utilized in an urban planter 900 will be described in accordance with at least some embodiments of the present invention. The urban planter 900 may comprise one or more cement sections 904, 916, 920 or other permanent planters. The root system 912 of the tree 908 may extend within the planter toward a first semi-permeable layer 928. The first semi-permeable layer 928 may fully contain the soil in which the plant 908 is planted. A second semi-permeable layer 924 may be provided as a safeguard layer. The second semi-permeable layer 924 may be utilized to ensure that no fertilizer or other elements escape into run-off water. The semi-permeable layers 924, 928 may be utilized in a number of different urban planter 900 configurations, examples of which can be seen in U.S. Pat. No. 4,019,279; US 2004/194,374; US 2002/100,211; U.S. Pat. No. 6,243,984; U.S. Pat. No. 5,953,858; U.S. Pat. No. 5,647,169; U.S. Pat. No. 5,528,857; U.S. Pat. No. 5,613,605; WO 9507018; U.S. Pat. No. 5,383,302; U.S. Pat. No. 5,305,549; U.S. Pat. No. 5,331,9098; U.S. Pat. No. 5,224,598; U.S. Pat. No. 5,222,326; and U.S. Pat. No. 5,442,891, the entire contents of which are hereby incorporated by reference in their entirety.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A root container comprising:
an open top portion,
a bottom portion interconnected with a sidewall, wherein the bottom portion and the sidewall have four different layers: (1) an outer support layer; (2) an outer semi-permeable layer; (3) an inner semi-permeable layer; and (4) an inner support layer, wherein said at least one of said outer semi-permeable layer and said inner semi-permeable layer comprises activated charcoal that is located around at least a portion of a plant root so as to facilitate the passage of water while restricting the passage of at least a portion of one of fertilizer, chemicals, and nutrients, wherein said at least one of said outer semi-permeable layer and said inner semi-permeable layer are pre-loaded with a fertilizer chemical to between about 5% to about 75% of its saturation level, said fertilizer chemical composed of sodium, potassium, nitrogen and phosphorous, and said container further having a centrally located hole therein to allow water to pass therethrough.

2. The root container as set forth in claim 1, further comprising a plug adapted to reside within the hole, wherein the plug comprises a first layer and a second layer, and said at least one of said first and second layers comprises activated charcoal.

* * * * *